(12) United States Patent
Mahar et al.

(10) Patent No.: US 10,630,943 B1
(45) Date of Patent: Apr. 21, 2020

(54) SMART SURVEILLANCE SYSTEMS

(71) Applicant: Vivint, Inc., Provo, UT (US)

(72) Inventors: Matthew Mahar, South Jordan, UT (US); Matthew J. Eyring, Provo, UT (US); Clint Huson Gordon-Carroll, Highland, UT (US); Jeremy B. Warren, Draper, UT (US); James Ellis Nye, Alpine, UT (US); Jefferson Huhta Lyman, Alpine, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 16/050,809

(22) Filed: Jul. 31, 2018

Related U.S. Application Data

(63) Continuation of application No. 14/680,847, filed on Apr. 7, 2015, now Pat. No. 10,044,990.

(51) Int. Cl.
*H04N 7/18* (2006.01)
*G08B 13/196* (2006.01)

(52) U.S. Cl.
CPC .......... *H04N 7/183* (2013.01); *H04N 7/181* (2013.01); *G08B 13/19691* (2013.01)

(58) Field of Classification Search
CPC ............... G08B 13/1968; G08B 13/19602
USPC .......................................................... 348/152
See application file for complete search history.

(56) References Cited

U.S. PATENT DOCUMENTS

| | | | |
|---|---|---|---|
| 6,137,485 A * | 10/2000 | Kawai | H04N 7/15 348/14.03 |
| 6,658,091 B1 | 12/2003 | Naidoo et al. | |
| 2004/0024851 A1 * | 2/2004 | Naidoo | G08B 13/19669 709/219 |
| 2006/0294565 A1 * | 12/2006 | Walter | A63F 13/12 725/108 |
| 2007/0291985 A1 | 12/2007 | Krahnstoever et al. | |
| 2008/0075243 A1 | 3/2008 | Kent et al. | |
| 2011/0090085 A1 * | 4/2011 | Belz | G08B 21/0423 340/573.1 |
| 2013/0063265 A1 | 3/2013 | Feldstein et al. | |

(Continued)

FOREIGN PATENT DOCUMENTS

WO        2014072910 A1       5/2014

OTHER PUBLICATIONS

Gill, et al., "Secure Remote Access to Home Automation Networks", IET Information Security, vol. 7, Issue 2, 2013, pp. 118-125.

*Primary Examiner* — Richard T Torrente
(74) *Attorney, Agent, or Firm* — Holland & Hart, LLP

(57) ABSTRACT

In some embodiments, the security and/or automation system, collectively referred to herein as automation system, may include a system for remotely monitoring a residence while respecting the privacy of occupants of the residence and the need for safety and security concerns. When a user is actively monitoring a residence, the system may provide a notification to occupants that remote monitoring is active. The remote monitoring may comprise video feed viewing of the residence, review of still images, audio review, and the like. The remote monitoring may allow review of multiple areas or rooms of a residence, the outside of a residence, and the like. The notifications may alert an occupant when a user is remotely viewing an audio feed, a video feed, images, or the like. However, the user may be disable the notifications if so desired.

20 Claims, 8 Drawing Sheets

(56) References Cited

U.S. PATENT DOCUMENTS

2015/0221151 A1\* 8/2015 Bacco ................ G07C 9/00087
340/5.83
2016/0055698 A1\* 2/2016 Gudmundsson ... G07C 9/00142
340/5.52

\* cited by examiner

SMART SURVEILLANCE SYSTEMS

CROSS REFERENCE

This application is a continuation of U.S. patent application Ser. No. 14/680,847, entitled "SMART SURVEILLANCE SYSTEMS," filed Apr. 7, 2015, the disclosure of which is incorporated herein by this reference in its entirety.

BACKGROUND

The present disclosure, for example, relates to security and/or automation systems, and more particularly to allow remote review of one or more monitoring systems and/or remote video.

Security and automation systems are widely deployed to provide various types of communication and functional features such as monitoring, communication, notification, and/or others. These systems may be capable of supporting communication with a user through a communication connection or a system management action.

In some instances, remote monitoring of a home can result in an invasion of privacy. Occupants of the home may be unaware of a user remotely reviewing a video feed of the home. This lack of privacy may be alarming to occupants. However, the user may still desire the remote monitoring capability in case of a security or safety event, therefore removing the systems completely is not a desirable solution. However, proactive alerting of remote monitoring may additionally compromise a safety or security event.

SUMMARY

In some embodiments, the security and/or automation system, collectively referred to herein as an automation system, may include a system for remotely monitoring a residence while respecting the privacy of occupants of the residence and the need for safety and security concerns. When a user is actively monitoring a residence, the system may provide a notification to occupants that remote monitoring is active. The remote monitoring may comprise live video feed viewing of the residence, review of recorded images, review of still images, audio review, and the like. The remote monitoring may allow review of multiple areas or rooms of a residence, the outside of a residence, and the like. The notifications may alert an occupant when a user is remotely viewing an audio feed, a video feed, images, or the like. However, the user may disable the notifications if so desired.

A method for security and/or automation systems is described. The method may include enabling remote access to a monitoring system. The monitoring system may comprise at least one image capturing device. The method may include receiving input that a user is remotely accessing the monitoring system and identifying an entity being remotely monitored by the user via the at least one image capturing device of the monitoring system. A notification may be selected to notify the entity of the remote monitoring based at least in part on the identifying.

Selecting the notification may further comprise dynamically determining when to bypass the notification. The notification may be deactivated based at least in part on the determining. In some instances, the identifying may further comprise using facial recognition to link the entity to a profile. A presence of an occupant of an area being actively monitored by the user may be located. The notification may be deactivated when no occupants are located in the area.

A status of the security and/or automation system may be ascertained. The notification may be selectively activated based at least in part on the ascertaining. An unauthorized entry to a residence may be detected and the user may be alerted of the unauthorized entry to the residence based at least in part on the detecting. The notification may be deactivated based at least in part on the alerting.

In some embodiments, one or more notifications may be activated based at least in part on the selecting. Input may be received to deactivate the notification; and the notification may be deactivated based at least in part on the receiving. A light source may be illuminated proximate the at least one image capturing device based at least in part on the selecting. A communications system may be activated based at least in part on input received from the user. The communications system may allow two-way communication between the entity being monitored and the user.

In another embodiment, an apparatus for security and/or automation systems is described. The apparatus may include a processor, memory in electronic communication with the processor, and instructions stored in the memory. The instructions may be executable by the processor to enable remote access to a monitoring system. The monitoring system may comprise at least one image capturing device. The instructions may further be executable by the processor to receive input that a user is remotely accessing the monitoring system and identify an entity being remotely monitored by the user via the at least one image capturing device of the monitoring system. The instructions may be executable by the processor to select a notification to notify the entity of the remote monitoring based at least in part on the identifying.

In another embodiment, a non-transitory computer-readable medium storing computer-executable code is described. The code may be executable by a processor to enable remote access to a monitoring system. The monitoring system may comprise at least one image capturing device. The code may be executable by a processor to receive input that a user is remotely accessing the monitoring system and identify an entity being remotely monitored by the user via the at least one image capturing device of the monitoring system. The code may be executable by a processor to select a notification to notify the entity of the remote monitoring based at least in part on the identifying.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

In some embodiments, an automation system may comprise one or more security features such as security cameras and/or microphones to record video and/or sound. The video feed and sound provided by the automation system may be accessed from locations that are remote to the automation system. For example, a remote user may access the video feed and sound on a mobile device, a computer, or the like. A remote user may comprise a user of the automation system who is physically removed from the system, viewing a video feed from a different location which may be in the same building, or the like. In some embodiments, the remote user may view a live feed provided by the security cameras. The live feed may include watching one or more subjects. The subject may comprise an entity, a person, a user of the automation system, a guest, an intruder, or the like. Viewing the live feed may violate the subject's sense of privacy. Therefore, in some embodiments, a notification may alert the subject of the remote monitoring. In some scenarios, the notification may be undesirable. For example, one or more security and/or safety alarms may be activated and the remote user may wish to deactivate the notifications. For example, an unwanted entity may be present in the home and the remote user may not want to alert the unwanted entity of the remote monitoring. In another instance, the remote user may wish to check on a babysitter watching their children and may not wish to notify the babysitter of the remote monitoring.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
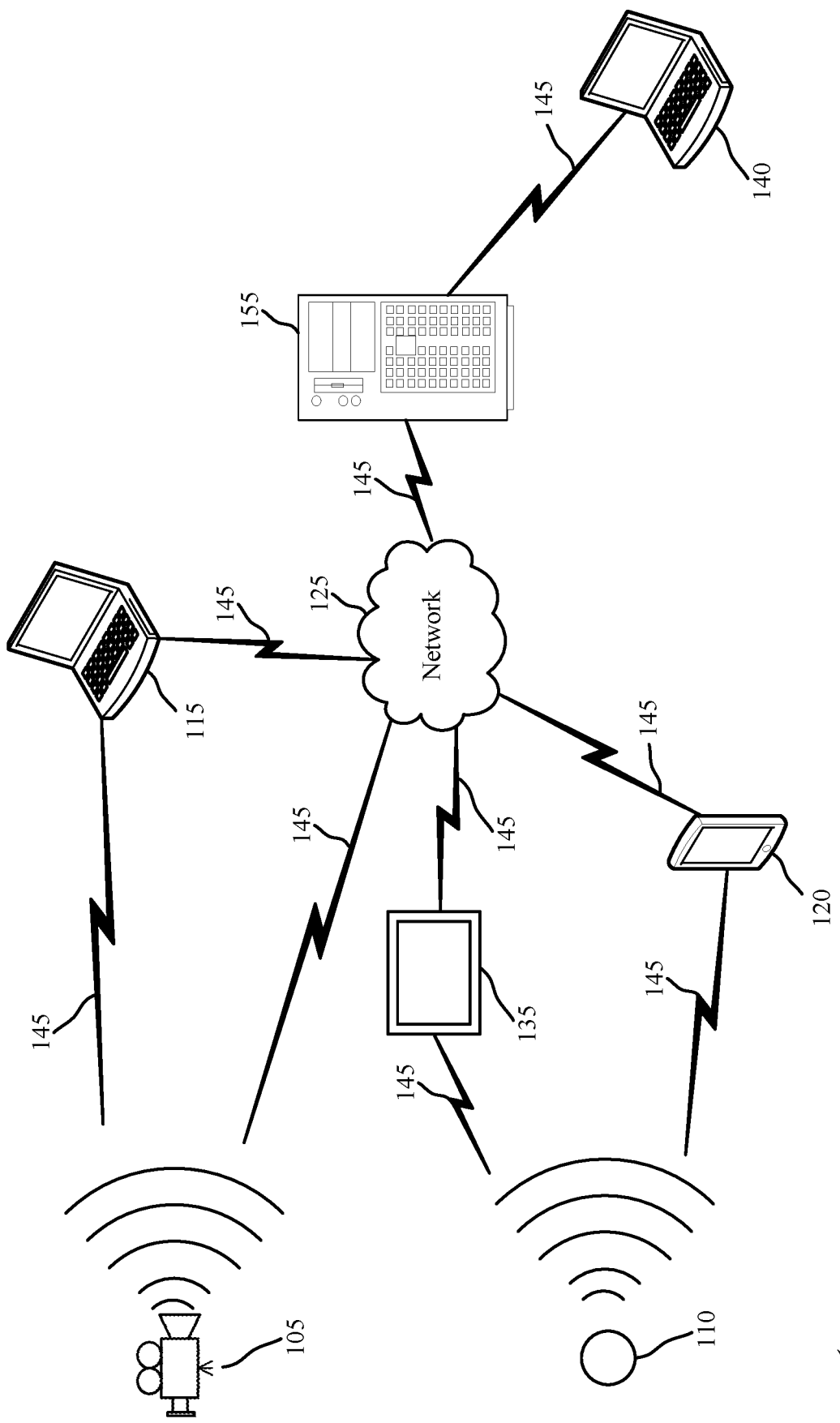
FIG. 1 is a block diagram of an example of a security and/or automation system in accordance with various embodiments.

FIG. 1 is an example of a communications system 100 in accordance with various aspects of the disclosure. In some embodiments, the communications system 100 may include one or more security cameras 105, one or more sensor units 110, local computing device 115, 120, network 125, server 155, control panel 135, and remote computing device 140. The one or more security cameras 105 and/or the one or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate embodiments, the network 125 may be integrated with any one of the local computing device 115, 120, server 155, or remote computing device 140, such that separate components are not required.

Local computing device 115, 120 and remote computing device 140 may be custom computing entities configured to interact with security cameras 105 and/or sensor units 110 via network 125, and in some embodiments, via server 155. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more security cameras 105, or may receive audiovisual data from the one or more security cameras 105 via local computing devices 115, 120 and network 125, or may receive data via remote computing device 140, server 155, and network 125. Additionally, the control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, a processor, an output, a data input, and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from security cameras 105 and/or sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the security cameras 105 and/or the sensor units 110. The remote computing device 140 may be functionally and/or structurally similar to the local computing devices 115, 120 and may be operable to receive data streams from and/or send signals to at least one of the security cameras 105 and/or the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 155.

In some embodiments, the one or more security cameras 105 may be image capturing devices configured to conduct periodic or ongoing automatic surveillance which may be related to security and/or safety issues. Each security camera 105 may be capable of viewing a wide area, or alternatively, separate security cameras 105 may monitor separate areas to prevent motion of the security cameras 105. For example, one security camera 105 may capture a predetermined region, while another security camera 105 (or, in some embodiments, the same security camera 105) may capture a separate region. In some embodiments, one or more security camera 105 may additionally monitor overlapping regions, such as having multiple security cameras 105 cover the same area for better coverage. The security camera 105 may monitor a variety of areas, such as outdoor grounds, rooms, entrances to a building, valuables, and the like. In alternate embodiments, a user may provide input directly at the local computing device 115, 120 or at remote computing device 140 to set the captured region. For example, a user may remotely view the captured image and change one or more mounting parameters to capture the specific angle desired.

The control panel 135 may wirelessly communicate with the sensor unit 110 via one or more communication links 145. The sensor unit 110 may be dispersed throughout the communications system 100 and each sensor unit 110 may be stationary and/or mobile. A sensor unit 110 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. A local computing device 115 and/or a sensor unit 110 may be able to communicate through one or more communication links 145 with various components such as control panels, base stations, and/or network equipment (e.g., servers, wireless communication points, etc.) and/or the like.

Data gathered by the one or more security cameras 105 and/or the one or more sensor units 110 may be communicated to local computing device 115, 120, which may be, in some embodiments, a thermostat, or other wall-mounted input/output smart home display. In other embodiments, local computing device 115, 120 may be a personal computer or smart phone. Where local computing device 115, 120 is a smart phone, the smart phone may have a dedicated application directed to collecting surveillance data and remotely communicating and/or viewing a property therefrom. The local computing device 115, 120 may process the data received from the one or more security cameras 105 and/or the one or more sensor units 110 to obtain information pertaining to the communications system 100. In alternate embodiments, remote computing device 140 may process the data received from the one or more sensor units 110, via network 125 and server 155, to obtain information pertaining to the property. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 115, 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from security cameras 105, sensor units 110, and/or local computing device 115, 120 or remote computing device 140), store and/or process data, and/or transmit data and/or data summaries (e.g., to remote computing device 140). For example, server 155 may receive a stream of surveillance data from a security camera 105, a stream of motion data from a sensor unit 110, and a stream of security data from either the same or another sensor unit 110. In some embodiments, server 155 may "pull" the data streams, e.g., by querying the security cameras 105 and/or sensor units 110, the local computing devices 115, 120, and/or the control panel 135. In some embodiments, the data streams may be "pushed" from the security cameras 105, the sensor units 110, and/or the local computing devices 115, 120 to the server 155. For example, the security cameras 105, the sensor units 110, and/or the local computing device 115, 120 may be configured to transmit data as it is generated by or entered into that device. In some instances, the security cameras 105, the sensor units 110, and/or the local computing devices 115, 120 may periodically transmit data (e.g., as a block of data or as one or more data points).

The server 155 may include a database (e.g., in memory) containing surveillance data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

A remote user may use the sensor unit 110 and/or the security camera 105 to remotely gather information about a building and/or residence where the automation system is installed. The remote user may access a feed from the security camera 105 and remotely view live and/or recorded footage captured by the security camera 105. To respect the privacy of a subject being monitored when the subject is being remotely viewed, a notification may be activated. The notification may comprise a light source and/or audio signal to alert the subject of the monitoring. In some embodiments, the notification may be dynamically activated depending upon an identity of the subject. For example, if the remote user is remotely monitoring an empty space, the notification may not be activated. Additionally, the remote user may not wish to notify all subjects of remote monitoring. For example, a remote user may not wish to notify a child or babysitter of the remote monitoring. Additionally, the remote user may not wish to activate the notifications if a security or safety alert is present. The alert may pertain to an unknown subject in the house and the user may not wish to notify the unknown subject of the remote monitoring.

In some embodiments, only subjects who are additionally users of the system and are associated with a user profile may specify notification parameters. The communications system 100 may utilize one or more recognition techniques to identify the subject being monitored and determine if the subject has a user profile. If the subject has a user profile, the notifications may be selectively activated based on the notification parameters associated with the identified user profile. If the subject being monitored does not have a user profile, the notification parameters may default to activating.

Figure 2:
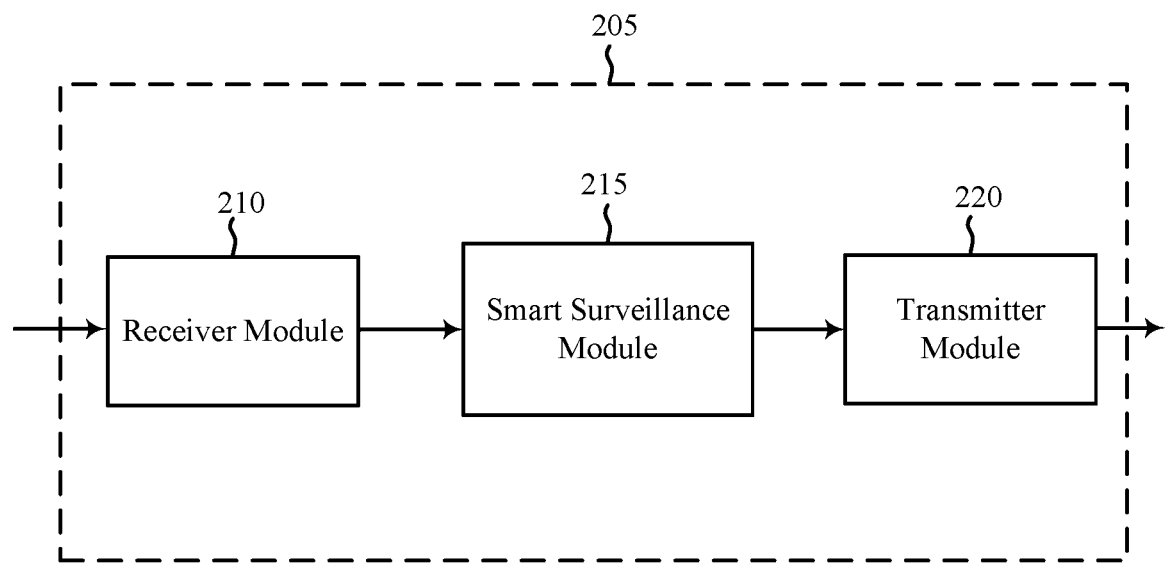
FIG. 2 shows a block diagram of a device relating to a security and/or an automation system, in accordance with various aspects of this disclosure.

FIG. 2 shows a block diagram 200 of a device 205 for use in electronic communication, in accordance with various aspects of this disclosure. The device 205 may be an example of one or more aspects of a local computing device 115, 120, control panel 135, or remote computing device 140, described with reference to FIG. 1. The device 205 may include a receiver module 210, a smart surveillance module 215, and/or a transmitter module 220. The device 205 may also be or include a processor. Each of these modules may be in communication with each other—directly and/or indirectly.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive one or more audio, visual, or audio-visual files from a security camera. The receiver module 210 may additionally be configured to receive one or more requests from a remote user to remotely view security footage, live footage, or establish a communication connection. Information may be passed on to the smart surveillance module 215, and to other components of the device 205.

The smart surveillance module 215 may allow for the remote monitoring of premises associated with an automation system and, in some instances, may allow for the remote communication with a subject, person, and/or entity being monitored. The remote monitoring may comprise a live stream of one or more security cameras. The smart surveillance module 215 may dynamically determine when to alert a subject of the remote monitoring. For example, based at least in part on one or more notification parameters, a notification may be activated to alert a subject of the remote monitoring. The notification parameters may comprise a presence of a subject being monitored, an identity of the subject being monitored, a state of the security system, automation system user profile preferences, and the like. The notifications may comprise a visual and/or audible signal. For example, a light source may be proximate the security camera and the smart surveillance module 215 may cause the light source to illuminate during active remote monitoring. In some instances, the notifications may additionally occur when the captured information is recorded. In another instance, the notifications may dynamically change depending upon the type of monitoring. For example, if active monitoring is occurring, the light source may be activated to illuminate a first color. If delayed or recorded monitoring is occurring, the light source may be activated to illuminate a second color. Likewise, an audible signal may be different depending upon the type of remote monitoring. In some embodiments, the remote user may activate one or more interactive communication systems to communicate with the person being monitored.

The transmitter module 220 may transmit the one or more signals received from other components of the device 205. The transmitter module 220 may transmit one or more images from the security camera to a device associated with a remote user. The transmitter module 220 may also transmit notification instructions to a security camera. For example, if a notification is to be provided to alert a subject that he/she is being remotely monitored, the transmitter module 220 may transmit an instruction to a light source, an audio source, etc. to activate in order to provide the desired notification. In some examples, the transmitter module 220 may be collocated with the receiver module 210 in a transceiver module.

Figure 3:
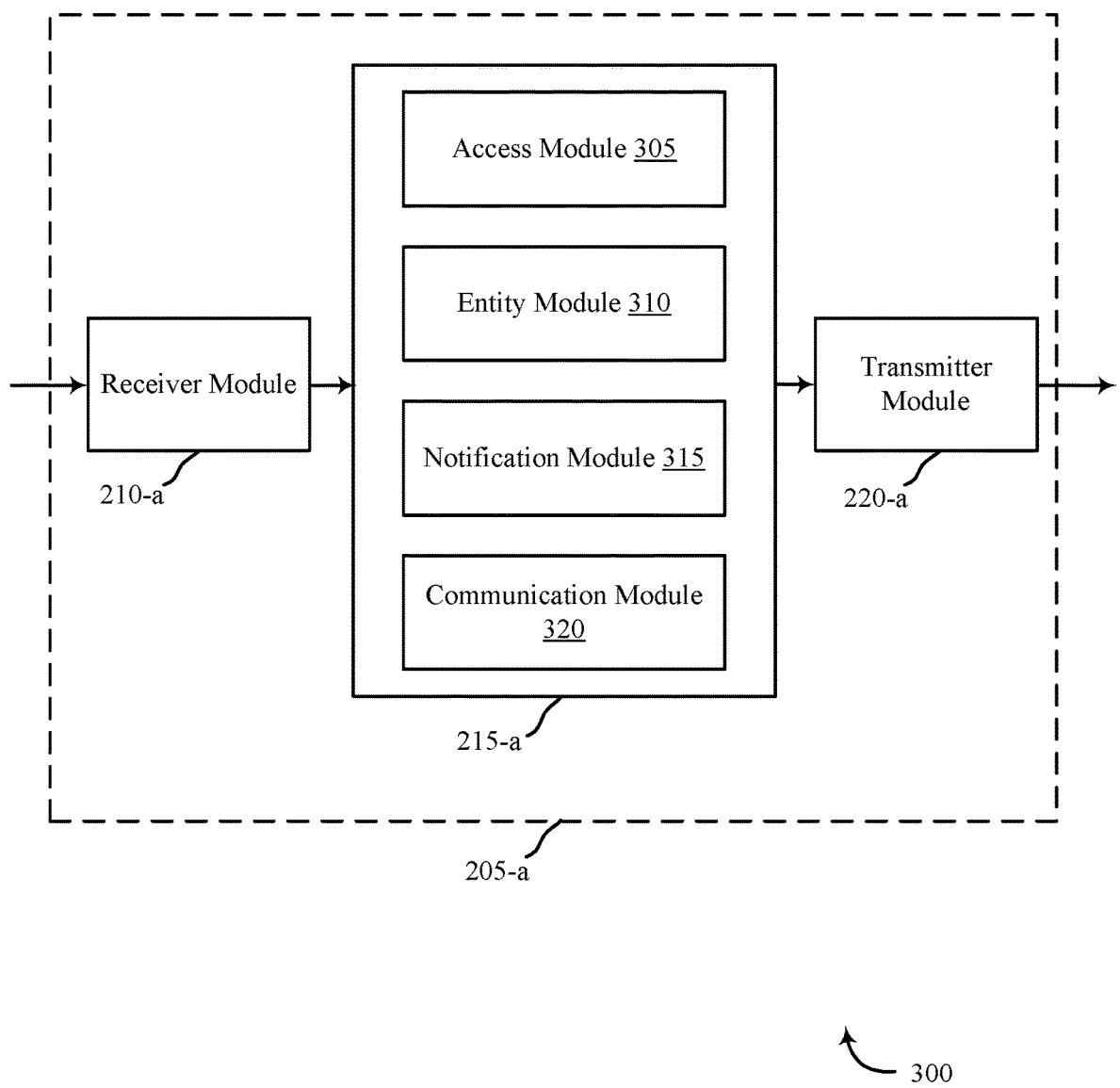
FIG. 3 shows a block diagram of a device relating to a security and/or an automation system, in accordance with various aspects of this disclosure.

FIG. 3 shows a block diagram 300 of a device 205-*a* for use in wireless communication, in accordance with various examples. The device 205-*a* may be an example of one or more aspects of a local computing device 115, 120, control panel 135, or remote computing device 140, described with reference to FIG. 1. It may also be an example of a device 205 described with reference to FIG. 2. The device 205-*a* may include a receiver module 210-*a*, a smart surveillance module 215-*a*, and/or a transmitter module 220-*a*, which may be examples of the corresponding modules of device 205. The device 205-*a* may also include a processor. Each of these components may be in communication with each other. The smart surveillance module 215-*a* may include an access module 305, an entity module 310, a notification module 315, and a communication module 320. The receiver module 210-*a* and the transmitter module 220-*a* may perform the functions of the receiver module 210 and the transmitter module 220, of FIG. 2, respectively.

The components of the device 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The access module 305 may grant and allow access to remotely view one or more feeds from one or more security cameras. The access module 305 may receive input from an administrator of an automation system to determine which users of the automation system are allowed remote monitoring access. Not every user of the automation system may be privy to viewing or accessing the monitoring system. If a residence comprises multiple occupants, the administrator may only wish for adults to have access to the monitoring system, or owners of the household, or parents, another authoritative figure, or the like. Restricting access may provide a level of privacy and security for potential subjects of the remote monitoring system.

The access module 305 may additionally receive and validate one or more requests to view feeds from the surveillance system. The access module 305 may identify the source of the request, pair the source with a user profile, and determine the access permissions associated with the profile. The access module 305 may then grant and/or deny the remote user access to the remote monitoring system.

The entity module 310 may determine if a subject may be exposed to clandestine observation. For example, after the request is granted by the access module 305, but prior to any data being transferred, the entity module 310 may detect the presence of one or more subjects graphically captured by the surveillance system. The entity module 310 may use motion detection, noise detection, image analysis, or the like to determine the presence of one or more subjects. If a subject is detected, the entity module 310 may determine an identity of the subject. The entity module 310 may use facial recognition, voice recognition, or the like to determine the identity. The entity module 310 may additionally review information from the automation system to determine the identity of the subject. For example, the remote user may have used a self-identifying code to access the system. The entity module 310 may detect one or more devices uniquely associated with a user of the automation system or other personnel and use the device to deduce the identity of the subject. For example, the entity module 310 may detect a mobile device and associate the mobile device with the identity of a user. The mobile device may have connected to a Wi-Fi network previously, or when connected, the owner of the mobile device may be required to enter identifying information. Additionally, the entity module 310 may determine if one or more security or safety alerts have been issued. The security or safety alert may comprise unauthorized entry into the residence, fire alarm, carbon monoxide alarm, unusual activity, or the like. The security and/or safety alert may indicate an unknown entity is present in the house, which may negate the need for notifications.

The notification module 315 may activate one or more notifications based at least in part on one or more notification parameters. The notification parameters may include, but are not limited to, the presence of at least one subject being monitored, the identity of the subject, a state of the security system, automation system user preferences, and the like. The notification may comprise a message to a mobile device associated with an automation system user (if the subject is a user of the automation system), a visual alert proximate the security camera, a notification on a control panel, an audible alert, some combination thereof, or the like. The visual alert proximate the camera may include causing a light source to be activated. The light source may comprise an LED light or the like. Activating the light source may comprise issuing an illumination command. The illumination command may cause the light source to blink at first and then maintain a steady illumination, or the light source may maintain a blinking or steady state during the active monitoring. The activation command may activate different colors depending upon the type of monitoring occurring.

If the area under active remote monitoring is devoid of any subjects, the notification module 315 may not activate a notification. Additionally, the notification module 315 may not activate a notification depending upon the identity of the subject in the monitoring area. The remote user may not wish to notify particular subjects that remote monitoring is occurring. For example, a security or safety alert may notify the remote user of an unauthorized entry into the residence. The remote user may wish to remotely monitor their residence without notifying a potential burglar. In other instances, the remote user may wish to monitor the activity of an unsupervised child in the residence without notifying the child that such monitoring is occurring. Therefore, the remote user may have the option to turn off notifications to prevent a subject from being notified that the remote monitoring is occurring.

The communication module 320 may facilitate communication between a remote user and a subject using one or more pieces of surveillance equipment. For example, the automation system may comprise one or more audio inputs and outputs proximate one or more image capturing devices. The audio inputs and outputs may enable a subject of the area being surveyed to communicate with a remote user viewing the area. The communication module 320 may be activated by the remote user. The communication module 320 may generate an additional notification to the subject which may advise the subject that a communication system was activated. The communication module 320 may cause an additional light source to be illuminated that is proximate the image capturing device as means of notification. The communication module 320 may additionally cause an audio notification of incoming communications from the remote user to be provided to the subject being monitored. The audio notification may be provided via a speaker on the security camera. In some instances, one or more visual displays may be proximate the image capturing device and may be activated by the communication module 320. The visual display may allow the subject to visually see the remote user as the two parties communicate.

Figure 4:
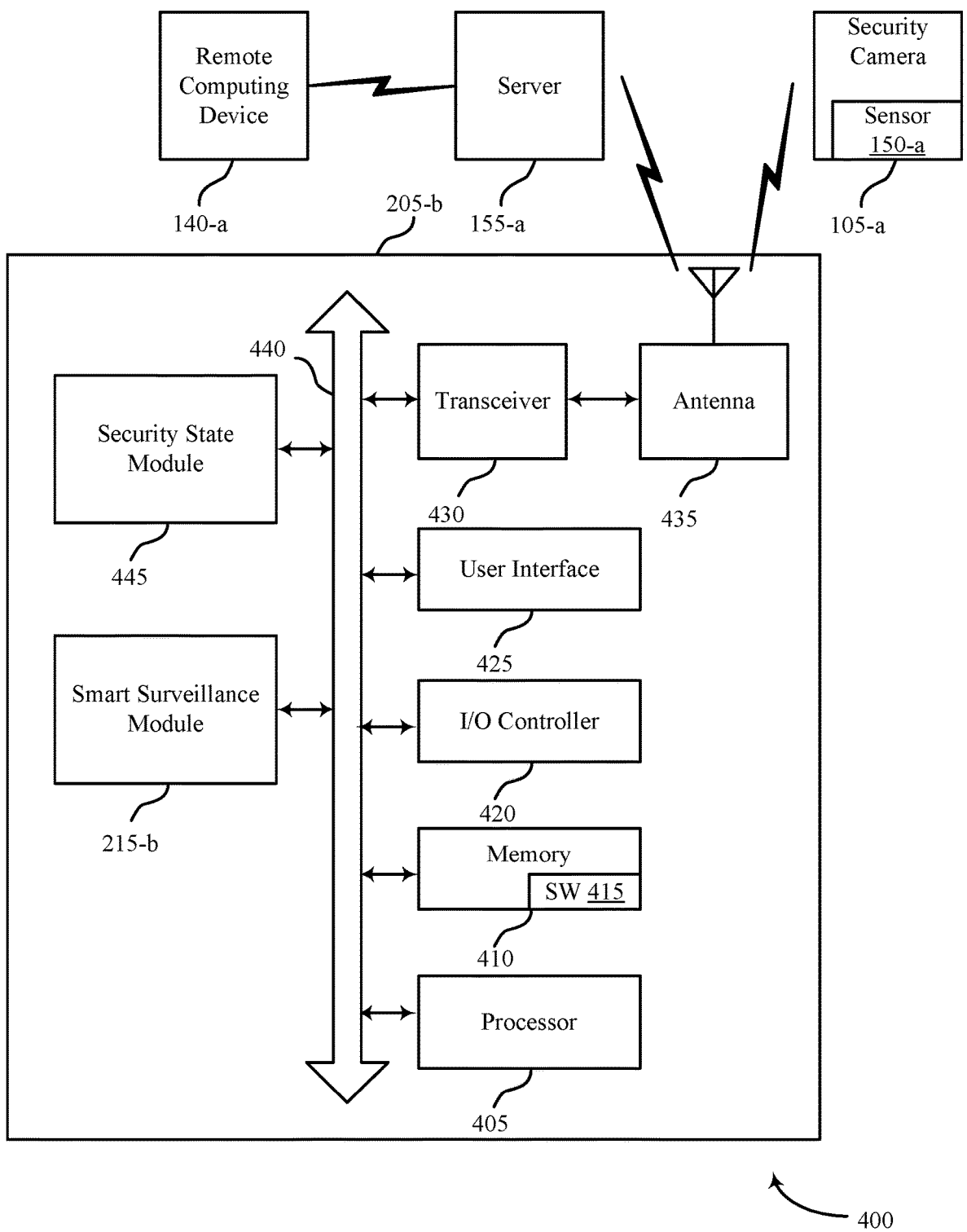
FIG. 4 shows a block diagram relating to a security and/or an automation system, in accordance with various aspects of this disclosure.

FIG. 4 shows a system 400 for use in smart surveillance systems, in accordance with various examples. System 400 may include a device 205-*b*, which may be an example of one or more aspects of a local computing device 115, 120, control panel 135, or remote computing device 140, described with reference to FIG. 1. The device 205-*b* may also be an example of one or more aspects of devices 205 and/or 205-*a* of FIGS. 2 and/or 3.

The device 205-*b* may include security state module 445. The device 205-*b* may also include a smart surveillance module 215-*b*, which may be an example of the smart surveillance module 215 and/or 215-*a* described with reference to FIGS. 2 and/or 3.

The device 205-*b* may also include components for bi-directional voice and data communications including components for transmitting communications and components for receiving communications. For example, the device 205-*b* may communicate bi-directionally with one or more of security camera 105-*a*, one or more sensors 150-*a*, remote computing device 140-*a*, and/or server 155-*a*, which may be an example of the remote computing device and server, respectively, of FIG. 1. This bi-directional communication may be direct (e.g., device 205-*b* communicating directly with server 155-*a*) or indirect (e.g., device 205-*b* communicating indirectly with remote computing device 140-*a* through server 155-*a*).

The security state module 445 may set the status of the automation and/or security system based at least in part on input from a user of the automation system and/or at least one sensor. For example, a user may intentionally set the automation system to "Home-Unarmed," "Home-Armed," "Away," "Away-Armed," "Vacation," and the like. The security state module 445 may additionally alter the state of the system based on input from one or more sensors. For example, an unauthorized entry or detection proximate the premises may result in a safety alert. Input from a smoke and/or carbon monoxide detector may alter the status to a safety concern.

The smart surveillance module 215-*b* may notify a subject of remote monitoring based at least in part on one or more notification parameters as described above with reference to FIGS. 2 and/or 3. The notification parameters may include, but are not limited to, the presence of at least one subject being monitored, an identity of the subject being monitored, a state of the security system, automation system user profile preferences (if the subject is a user of the automation system), and the like. A remote user may additionally use the smart surveillance module 215-*b* to facilitate remote communication with the subject using audiovisual technology.

The device 205-*b* may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of security camera 105-*a*, remote computing device 140-*a*, and/or server 155-*a*. The transceiver module 430 may include a modem to modulate the packets and provide the modulated packets to the one or more antennas 435 for transmission, and to demodulate packets received from the one or more antenna 435. While a device (e.g., 205-*b*) may include a single antenna 435, the device may also have multiple antennas 435 capable of concurrently transmitting or receiving multiple wired and/or wireless transmissions. In some embodiments, one element of device 205-*b* (e.g., one or more antennas 435, transceiver module 430, etc.) may provide a direct connection to a remote server 155-*a* via a direct network link to the Internet via a POP (point of presence). In some embodiments, one element of device 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-*a* (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of device 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., notifying a person of remote monitoring, identifying a person being monitored, establishing a communication link, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the security state module 445 and/or smart surveillance module 215-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the security camera 105-a may include a single antenna, the security camera 105-a may have multiple antennas capable of concurrently transmitting and/or receiving multiple wireless transmissions.

Figure 5:
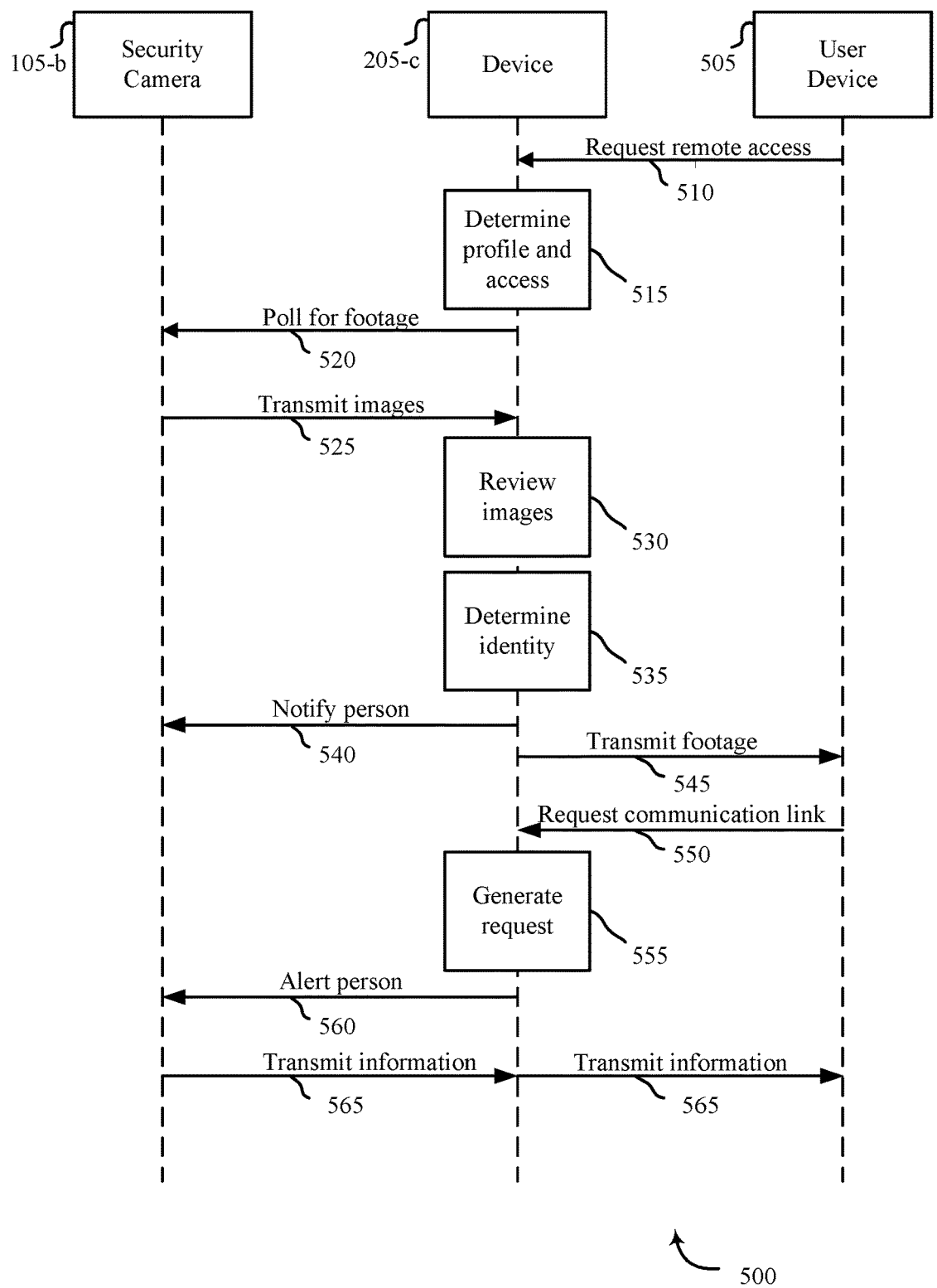
FIG. 5 shows a swim diagram relating to a security and/or an automation system, in accordance with various aspects of this disclosure.

FIG. 5 shows a swim diagram 500 for use in smart surveillance systems, in accordance with various examples. The diagram 500 may include a device 205-c, which may be an example of one or more aspects of a local computing device 115, 120, control panel 135, or remote computing device 140, described with reference to FIG. 1. The device 205-c may also be an example of one or more aspects of devices 205, 205-a, and/or 205-b of FIGS. 2, 3, and/or 4. The diagram 500 may also include a security camera 105-b, which may be an example of the security camera 105, 105-a described with reference to FIGS. 1 and/or 4. The diagram 500 may additionally include a user device 505 which may be an example of the local computing device 115, 120 and/or the remote computing device 140 described with reference to FIG. 1.

A remote user of the automation system may request remote access 510 to security footage via the user device 505. The device 205-c may determine a profile 515 associated with the remote user and determine if the remote user has access to the security system. If the device 205-c approves the request, the device 205-c may poll the security camera 105-b for footage 520. The security camera 105-b may respond by transmitting images 525 to the device 205-c. The device 205-c may review the images 530 to determine the presence of an entity. The entity may comprise a subject which may include a person being monitored. The device 205-c may additionally use other information pertaining to the automation system to determine the presence of a subject such as the triggering of one or more security events, the triggering of a motion detector, and the like.

The device 205-c may use the images and other information to determine an identity 535 of the subject. For example, the device 205-c may use voice recognition, facial recognition, security features, and the like. Depending on the identification of the subject being monitored, the device 205-c may selectively notify 540 the subject that he/she is being monitored. The device 205-c may also grant viewing permissions by transmitting footage 545 to the user device 505 for the remote user to view.

In some instances, the remote user may, via the user device 505, request a communication link 550 with the subject being monitored. The communication link may be established between the security camera 105-b and the user device 505. The device 205-c may generate the communication request 555 and alert the subject being monitored of the communication link 560 between the security camera 105-b and the user device 505. The subject may respond and the security camera 105-b may transmit the information 565 back to the user device 505 via the device 205-c.

Figure 6:
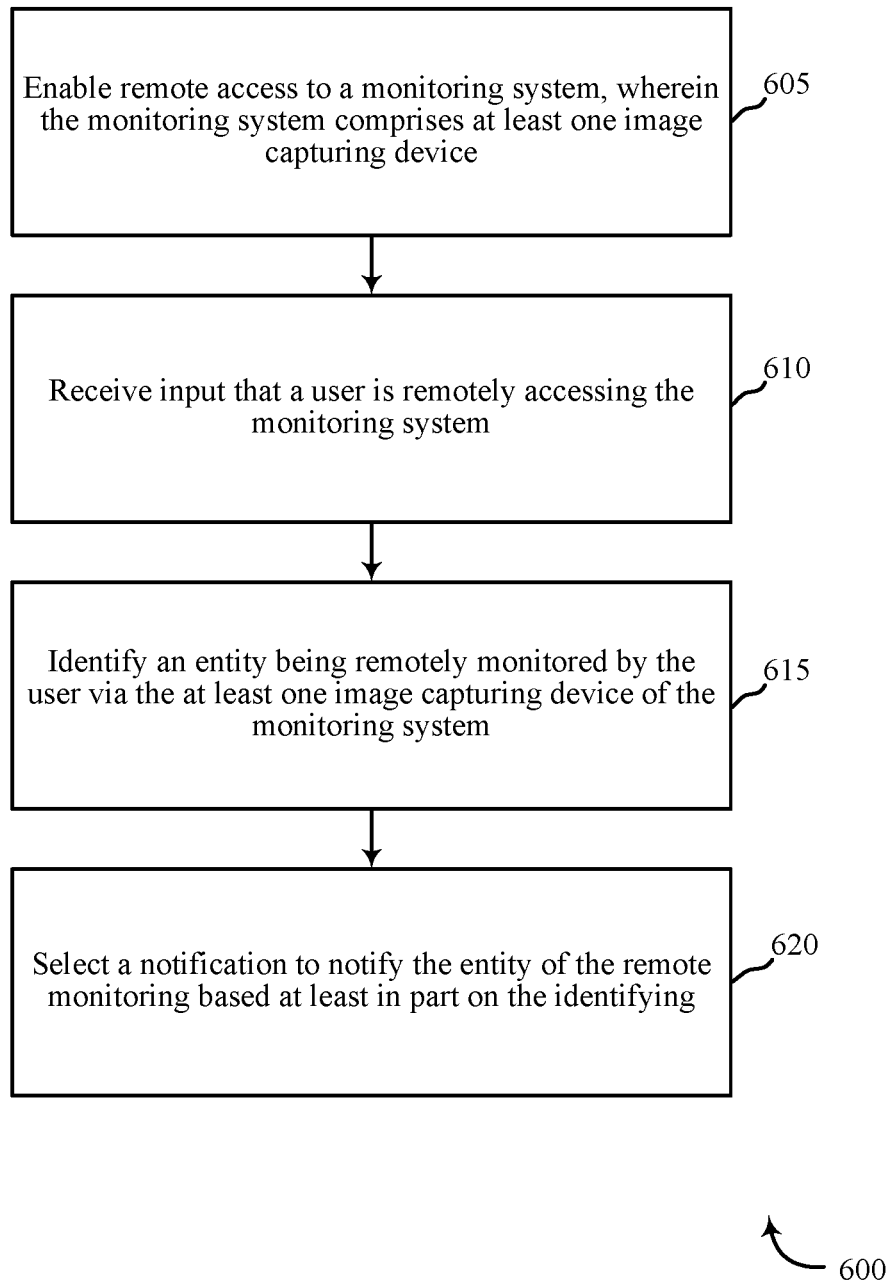
FIG. 6 flow chart illustrating an example of a method relating to a security and/or an automation system, in accordance with various aspects of this disclosure.

FIG. 6 is a flow chart illustrating an example of a method 600 for smart surveillance systems, in accordance with various aspects of the present disclosure. For clarity, the method 600 is described below with reference to aspects of one or more of the smart surveillance module 215 described with reference to FIGS. 2-4, and/or aspects of one or more of the security state module 445 described with reference to FIG. 4. In some examples, a device may execute one or more sets of codes to control the functional elements of the security camera to perform the functions described below. Additionally or alternatively, the device may perform one or more of the functions described below using special-purpose hardware.

At block 605, the method 600 may include enabling remote access to a monitoring system, wherein the monitoring system comprises at least one image capturing device. For example, the method 600 may allow a remote user to use a computing device to view one or more surveillance feeds. The enabling may include receiving input from one or more administrators of the automation system which lists access permissions in a user profile. The default user access may limit the access only to an administrator. The administrator may need to positively alter a user's profile to allow remote access. This may protect any occupant of the residence from excessive or intrusive invasions of privacy. In addition to granting a user of the automation system access to the remote monitoring system, the user profile may define notification parameters and/or limit the viewing capabilities. For example, a user may be granted permission to utilize the remote monitoring system but if the user is a remote user viewing the system, the user may be required to always activate the notifications. In another embodiment, the user profile may allow the remote user to dynamically change the notifications. A user profile may additionally limit the accessibility of the remote monitoring system. For example, a remote user may only be granted access to common areas but not more private rooms such as bedrooms or bathrooms. In another embodiment, a remote user may have permissions to access all parameters of the remote viewing system. Additionally, the viewing permissions may be linked to a security state of the automation system. For example, the more private areas may default to disallow remote viewing under normal circumstances. Under predetermined circumstances, the default setting may be disregarded. For example, if the automation system is set to "Away" or "Vacation" mode, the need for privacy may be nullified and the privacy defaults may be negated. Additionally, if a security and/or safety alert has been activated, the privacy defaults may be overridden.

At block 610, the method 600 may include receiving input that a remote user is accessing the monitoring system. This may include receiving a request from a remote user to access surveillance information. The method 600 may confirm the request was propagated from a user of the automation system with appropriate profile permissions to view surveillance information. In rare occurrences, the request may be from an administrator to stream surveillance information to one or more emergency personnel if a safety and/or security issue is present. The request may be generated by a remote user from a mobile device or a computing device remote from the automation system. The remote user may utilize an interface associated with the automation system such as a web interface or an application on their mobile device. The request may specify the desired viewing areas or may be more generic. For example, the remote user may wish to browse all security feeds. The remote user may additionally wish to view a specific room such as the kitchen or living room. In another embodiment, the remote user may only wish to view feeds which depict an entity, subject, and/or a moving object. The remote user may additionally request to view an area where a sensor may have been activated to ascertain the gravity of a situation. For example, a motion detection sensor may have been activated. The remote user may wish to determine what triggered the motion sensor. The remote user may use the remote surveillance information to determine a pet was left unrestrained, or a window was left open and a breeze may have moved a curtain or papers, or the like.

The operation(s) at block 605 and/or 610 may be performed using the access module 305 described with reference to FIG. 3.

At block 615, the method 600 may include identifying an entity being remotely monitored by the remote user via the at least one image capturing device of the monitoring system. For example, the surveillance footage may observe an entity. The entity may be a subject such as a person. The footage may be analyzed to determine an identity of the subject using multiple methods. For example, the method 600 may use facial recognition and/or voice recognition to identify the subject. The method 600 may additionally use security information to identity the subject. The subject may be a user of the automation system and may have utilized a self-identifying code to access the building and may be the only person proximate the building. Similarly, the only people in the building may have triggered an unauthorized access alert thereby identifying the subject as foreign to the automation system. A subject may additionally have connected a mobile device to a Wi-Fi network associated with the automation system and may have provided self-identifying information. If the subject is accompanied by another user of the automation system local to the automation system, the local user may identify the subject to the automation system. For example, the method 600 may observe the subject and be unable to identify the subject but may identify the local user proximate the subject. The local user may be pinged and requested to provide identifying information of the unknown subject.

The operation(s) at block 615 may be performed using the entity module 310 described with reference to FIG. 3.

At block 620, the method 600 may include selecting a notification to notify the subject of the remote monitoring based at least in part on the identifying. The notification may comprise a visual notification, an audible notification, a lack of notification, some combination thereof, or the like. For example, if the subject being observed is a known person with a user profile, the remote user may wish to notify the subject that remote viewing is occurring. Additionally, the subject may be a user of the automaton system with a user profile which may require the subject to be notified of any remote viewing. In contrast, if the subject is not a known entity, the remote user may not wish to alert the subject of the surveillance system. For example, if a theft or other illicit act is occurring, the remote user may wish to capture the act on film to aid in the persecution of the subject. In another embodiment, the remote user may be a parent viewing a child left at home and may not wish to alert the child that they are being watched. This may allow the parent to view the actions of the child to verify whether or not the child's behavior falls within certain behavior protocols established by the parent.

The operation(s) at block 620 may be performed using the notification module 315 described with reference to FIG. 3.

Thus, the method 600 may provide for smart surveillance systems relating to automation/security systems. It should be noted that the method 600 is just one implementation and that the operations of the method 600 may be rearranged or otherwise modified such that other implementations are possible.

Figure 7:
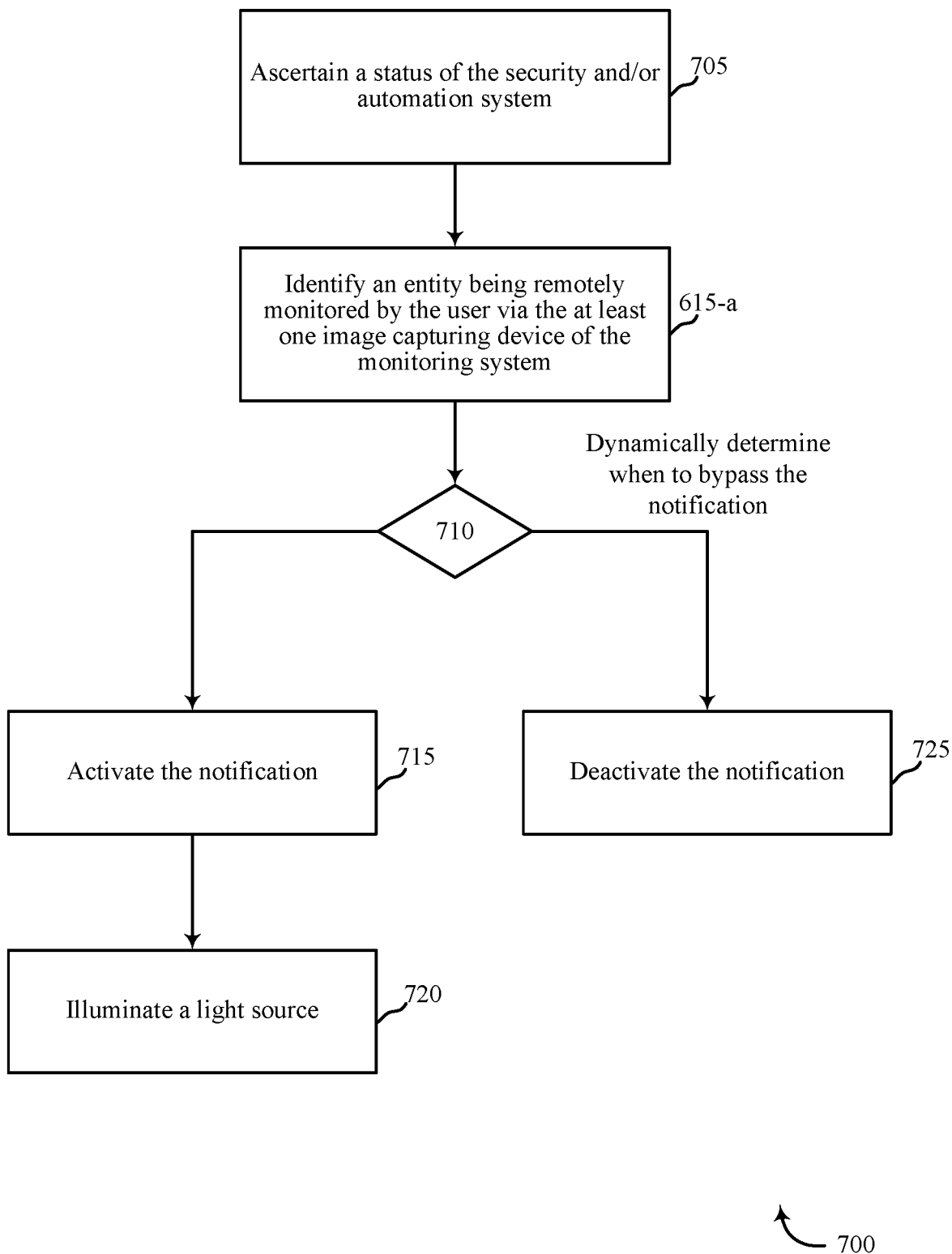
FIG. 7 is a flow chart illustrating an example of a method relating to a security and/or an automation system, in accordance with various aspects of this disclosure.

FIG. 7 is a flow chart illustrating an example of a method 700 for smart surveillance systems, in accordance with various aspects of the present disclosure. For clarity, the method 700 is described below with reference to aspects of one or more of the smart surveillance modules 215 described with reference to FIGS. 2-4, and/or aspects of one or more of the security state module 445 described with reference to FIG. 4. In some examples, a device may execute one or more sets of codes to control the functional elements of the security camera to perform the functions described below. Additionally or alternatively, the device may perform one or more of the functions described below using special-purpose hardware.

At block 705, the method 700 may include ascertaining a status of the security and/or automation system. The status of the system may comprise a user established setting and/or a security setting triggered by one or more sensors. For example, a user of the automation system may intentionally set the automation system to "Home-Unarmed," "Home-Armed," "Away," "Away-Armed," "Vacation," and the like. The security state may additionally be altered based on input from one or more sensors. For example, an unauthorized entry or detection proximate the premises may result in a safety alert. Input from a smoke and/or carbon monoxide detector may alter the status to a safety concern. The status may additionally be affected by one or more public bulletins. For example, a weather alert, a criminal alert, or the like.

The operation(s) at block 705 may be performed using the security state module 445 described with reference to FIG. 4.

At block 615-a, the method 700 may include identifying an entity being remotely monitored by the user via the at least one image capturing device of the monitoring system as described with reference to FIG. 6.

At block 710, the method 700 may dynamically determine when to bypass the notification. For example, based at least in part on the security state and/or the subject, at least one notification may be activated. The notification may be activated if the security state is an emergency situation and occupants of a building need to vacate the premises. The notification may additionally be required by certain subjects if the subject is linked to a user profile and the user profile requires notifications. For example, if the remote user is accessing the surveillance system and the subject being observed is a user of the automation system, the profile of the subject may require a notification. Additionally, if a security and/or safety status is activated, the remote user may not wish to alert an unauthorized subject of the surveillance system.

If the answer at block 710 does not bypass the notifications, at block 715, the method 700 may include activating one or more notifications. Activating the notifications may include, at block 720, issuing a command to illuminate a light source. The light source may be proximate a security camera. In some embodiments, the light source may comprise preexisting infrastructure in a building such as overhead lighting. In other embodiments, the light source may comprise a light source incorporated into the security camera which may illuminate. Activating the light source may comprise generating and issuing a command to activate the light source. The command may include variations on the notification such as duration of illumination, consistency of notification (i.e. blinking), color of the light source, and the like.

If the answer at block 710 bypasses the notifications, at block 725, the method may include deactivating the one or more notifications. This may prevent any notifications from being activated. In some instances, if the notifications have been activated, this may include deactivating them.

The operation(s) at block 705, 710, 715, 720, and 725 may be performed using the notification module 315 described with reference to FIG. 3.

Thus, the method 700 may provide for smart surveillance systems relating to automation/security systems. It should be noted that the method 700 is just one implementation and that the operations of the method 700 may be rearranged or otherwise modified such that other implementations are possible.

Figure 8:
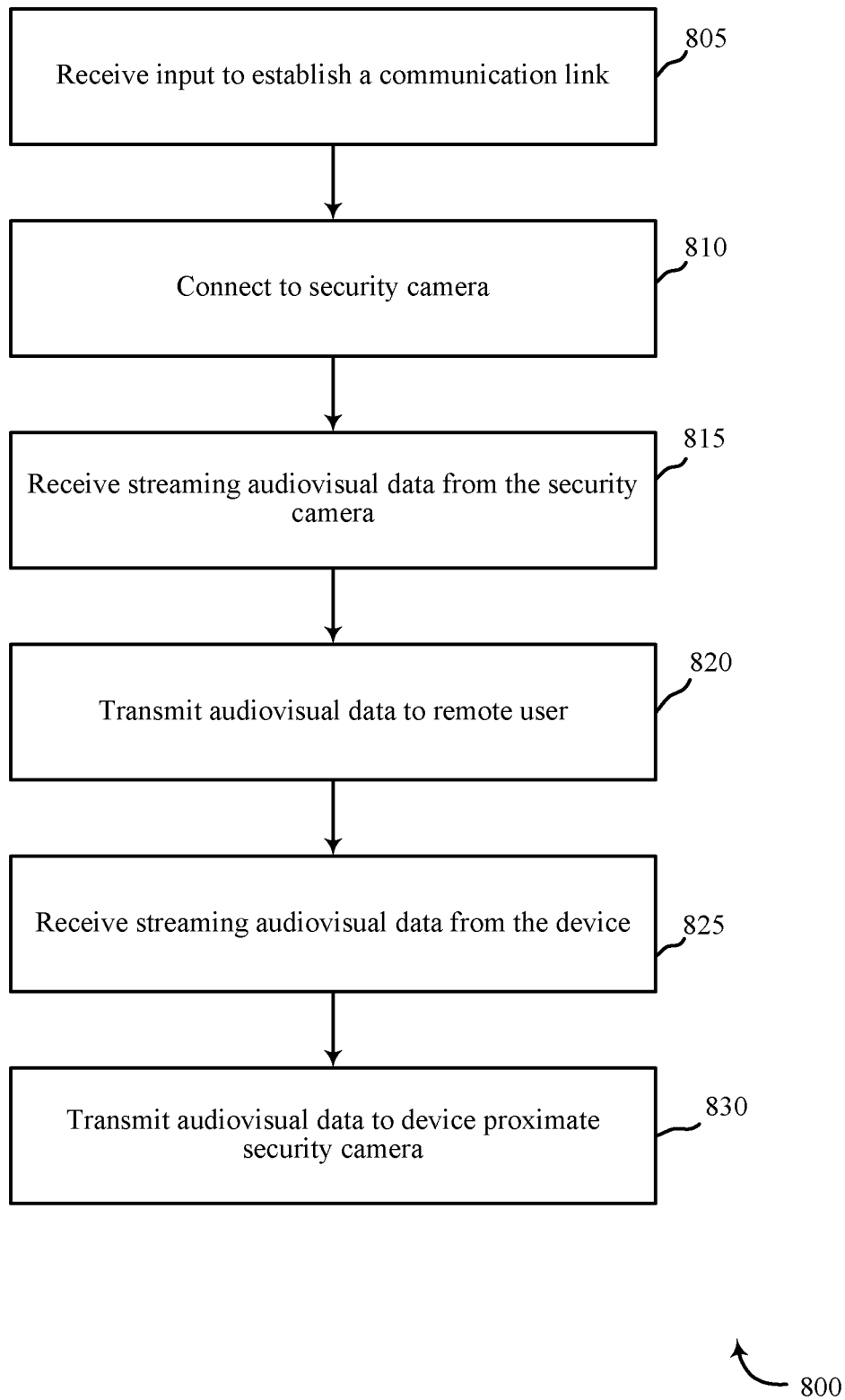
FIG. 8 is a flow chart illustrating an example of a method relating to a security and/or an automation system, in accordance with various aspects of this disclosure.

FIG. 8 is a flow chart illustrating an example of a method 800 for smart surveillance systems, in accordance with various aspects of the present disclosure. For clarity, the method 800 is described below with reference to aspects of one or more of the smart surveillance modules 215 described with reference to FIGS. 2-4, and/or aspects of one or more of the security state module 445 described with reference to FIG. 4. In some examples, a device may execute one or more sets of codes to control the functional elements of the security camera to perform the functions described below. Additionally or alternatively, the device may perform one or more of the functions described below using special-purpose hardware.

At block 805, the method 800 may include receiving input to establish a communication link. The communication link may allow a remote user to communicate with an occupant of the residence who may be a subject of the remote monitoring system. The remote monitoring system may be used to establish a communication connection. The input may come from a remote user with permissions to access the surveillance system. The input may comprise a request from a mobile device, a laptop, desktop, or any other computing device.

At block 810, the method 800 may include connecting to a security camera. In some embodiments, multiple security cameras may be available. The request may connect to each security camera or may specify a security camera. The remote user may have the option of selecting which view to use, or the method 800 may suggest one or more cameras based on a sensor activation and/or the presence of at least one subject in a room. The remote user may have the option of viewing each live feed to determine which subject the remote user may communicate with.

At block 815, the method 800 may include receiving streaming audiovisual data from the security camera. In some embodiments, the security camera may be fully equipped to transmit sound and/or video. A video and/or sound interface may be proximate the camera and may allow a remote user to communicate with the subject. The combination of interfaces may allow a remote user and a subject to visually interact during a conversation. In another embodiment, the remote user and subject may communicate via an audio feed. This may be beneficial in situations where the subject does not have access to a telephonic device and/or in an emergency situation. A parent may use this system to communicate with a child and/or babysitter, a mobile device may be out of battery, or a person may be non-responsive to other means of communication when an emergency situation is present.

At block 820, the method 800 may include transmitting the audiovisual data to the remote user. This may establish an initial connection to the subject. In response, at block 825, the method 800 may include receiving streaming audiovisual data from the remote user via a device associated with the remote user. The method 800 may then, at block 830, transmit the streaming audiovisual data to a device proximate the security camera. This may establish a communicative connection between the subject and the remote user facilitated by the automation system.

The operation(s) at block 805, 810, 815, 820, 825, and/or 830 may be performed using the communication module 320 described with reference to FIG. 3.

Thus, the method 800 may provide for smart surveillance systems relating to automation/security systems. It should be noted that the method 800 is just one implementation and that the operations of the method 800 may be rearranged or otherwise modified such that other implementations are possible.

In some examples, aspects from two or more of the methods 600, 700, and/or 800 may be combined and/or separated. It should be noted that the methods 600, 700, and/or 800 are just example implementations, and that the operations of the methods 600, 700, and/or 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:

receiving, at an automation system, an input from a user to establish a communication link with a security camera;

determining, via the automation system, an identity of a person being monitored by the user based at least in part on the received input from the user;

analyzing, at the automation system, an audiovisual feed from the security camera to verify the identity of the person;

connecting, via the automation system, to the security camera based at least in part on analyzing the audiovisual feed from the security camera;

receiving, at the automation system, a first streaming audiovisual data from the security camera;

transmitting the first streaming audiovisual data to a device associated with the user;

receiving a second streaming audiovisual data from the user; and transmitting the second streaming audiovisual data to an interface proximate the security camera.

2. The method of claim 1, further comprising:

determining a presence of the person at or near the security camera based at least in part on analyzing the audiovisual feed from the security camera; and selecting the security camera from a plurality of security cameras based at least in part on determining the presence of the person.

3. The method of claim 2, further comprising:

establishing a communicative connection between the person being monitored and the user.

4. The method of claim 2, further comprising:

transmitting to the user, a suggestion of one or more of the plurality of security cameras based at least in part on a sensor activation, the presence of the person in a room, or both; and receiving a second input from the user indicating a selection of the security camera from the plurality of security cameras.

5. The method of claim 4, further comprising:

selecting the security camera from the plurality of security cameras based at least in part on receiving the second input from the user.

6. The method of claim 2, wherein the selecting is based at least in part on the user viewing a live feed of one or more of the plurality of security cameras.

7. The method of claim 2, further comprising:

selecting the interface proximate the security camera from a plurality of interfaces based at least in part on the selecting the security camera from the plurality of security cameras.

8. The method of claim 1, wherein the first streaming audiovisual data and second streaming audiovisual data comprise a first audio feed, a second audio feed, or both.

9. The method of claim 1, wherein the user is remotely located from the automation system.

10. A system for security and/or automation, comprising:

a processor;

memory in electronic communication with the processor; and instructions stored in the memory, the instructions being executable by the processor to:

receive, at the system, an input from a user to establish a communication link with a security camera;

determine, via the system, an identity of a person being monitored by the user based at least in part on the received input from the user;

analyze, at the system, an audiovisual feed from the security camera to verify the identity of the person;

connect, via the system, to the security camera based at least in part on analyzing the audiovisual feed from the security camera;

receive, at the system, a first streaming audiovisual data from the security camera;

transmit the first streaming audiovisual data to a device associated with the user;

receive a second streaming audiovisual data from the user; and transmit the second streaming audiovisual data to an interface proximate the security camera.

11. The system of claim 10, wherein the instructions are further executable to:

determine a presence of the person at or near the security camera based at least in part on analyzing the audiovisual feed from the security camera; and select the security camera from a plurality of security cameras based at least in part on determining the presence of the person.

12. The system of claim 11, wherein the instructions are further executable to:

establish a communicative connection between the person being monitored and the user.

13. The system of claim 11, wherein the instructions are further executable to:

transmit to the user a suggestion of one or more of the plurality of security cameras based at least in part on a sensor activation, the presence of the person in a room, or both; and receive a second input from the user indicating a selection of the security camera from the plurality of security cameras.

14. The system of claim 13, wherein the instructions are further executable to:

select the security camera from the plurality of security cameras based at least in part on receiving the second input from the user.

15. The system of claim 11, wherein the selecting is based at least in part on the user viewing a live feed of one or more of the plurality of security cameras.

16. The system of claim 11, wherein the instructions are further executable to:

select the interface proximate the security camera from a plurality of interfaces based at least in part on the selecting the security camera from the plurality of security cameras.

17. The system of claim 10, wherein the first streaming audiovisual data and second streaming audiovisual data comprise a first audio feed, a second audio feed, or both.

18. The system of claim 10, wherein the user is remotely located from the system.

19. A non-transitory computer-readable medium storing computer-executable code, the code comprising instructions executable by a processor to:

receive, at an automation system, an input from a user to establish a communication link with a security camera;

determine, via the automation system, an identity of a person being monitored by the user based at least in part on the received input from the user;

analyze, at the automation system, an audiovisual feed from the security camera to verify the identity of the person;

connect, via the automation system, to the security camera based at least in part on analyzing the audiovisual feed from the security camera;

receive, at the automation system, a first streaming audiovisual data from the security camera;

transmit the first streaming audiovisual data to a device associated with the user;

receive a second streaming audiovisual data from the user; and transmit the second streaming audiovisual data to an interface proximate the security camera.

20. The non-transitory computer-readable medium of claim 19, wherein the instructions are further executable to:

determine a presence of the person at or near the security camera based at least in part on analyzing the audiovisual feed from the security camera; and select the security camera from a plurality of security cameras based at least in part on determining the presence of the person.

* * * * *